Figure 1:
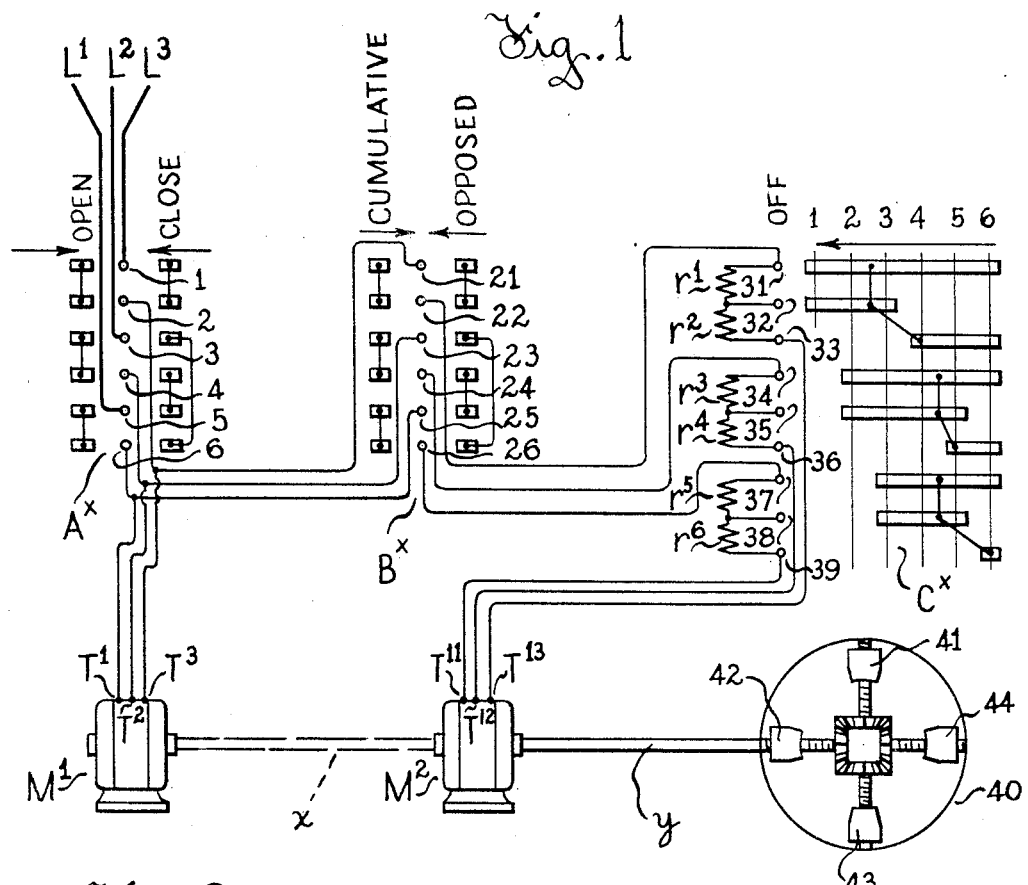

March 2, 1943.  E. W. SEEGER ET AL  2,312,592

CONTROL SYSTEM FOR ALTERNATING CURRENT MOTORS

Filed June 16, 1941  2 Sheets-Sheet 1

Inventors
Edwin W. Seeger
Carroll Stansbury

By Frank H. Hubbard
Attorney

Inventor
Edwin W. Seeger
Carroll Stansbury
By Frank H. Hubbard
Attorney

Patented Mar. 2, 1943

2,312,592

UNITED STATES PATENT OFFICE 2,312,592

CONTROL SYSTEM FOR ALTERNATING CURRENT MOTORS

Edwin W. Seeger and Carroll Stansbury, Wauwatosa, Wis., assignors to Cutler-Hammer, Inc., Milwaukee, Wis., a corporation of Delaware Application June 16, 1941, Serial No. 398,248

16 Claims. (Cl. 172—179)

This invention relates to a control system for alternating current motors and particularly to the control of the speed-torque of polyphase induction motors.

In the conventional induction motor, the no-load speed is substantially that of the speed of rotation of the magnetic field of the stator, which latter is dependent only on the number of stator poles and the frequency of the source of current supply. When the motor is running loaded, its speed may be varied by the insertion of resistance in its primary or secondary circuit, but the resulting speed reduction of the motor depends upon the load, and its no-load speed remains substantially the same, irrespective of the value of the resistance.

For certain applications it is desirable that the starting torque of the motor, that is the torque at zero speed, be relatively low and that the torque be relatively high at normal speed, which approaches the synchronous speed. At the same time it is desirable to change the speed-torque characteristic for given applications within very wide limits. It is further frequently desirable to employ simple electrical means for controlling the low-load speed of induction motor drives, without resorting to special generators affording frequency and voltage control of the power supply.

Such a control is desirable, for instance, in motor drives for the chucks of automatic screw machines and the like.

The present invention contemplates the use of two induction motors which may be of the squirrel-cage type, and which are mechanically coupled with each other and to the chuck or the like. The two motors may have either the same or different synchronous speeds and the same or different speed-torque characteristics. The motors are controlled so that they may be operated either cumulatively; that is, generally tending to rotate in the same direction; or differentially, whereby one motor tends to rotate oppositely to the direction of rotation of the other motor. By also varying the voltage impressed upon one motor relatively to the voltage impressed upon the other motor it is possible to still further vary the combined speed-torque characteristic of the motors.

An object of the present invention is to provide an induction motor drive affording adjustment of the speed-torque characteristic of the drive within very wide limits.

Another object is to provide a reversible induction motor drive wherein the speed-torque characteristics for the two directions of rotation may be adjusted independently of each other.

Other objects and advantages will hereinafter appear.

The accompanying drawings are illustrative of a number of embodiments of the invention.

In the drawings,

Figure 1 illustrates a drive comprising two reversible squirrel-cage induction motors which are controlled by means embodying the present invention.

Figure 2:
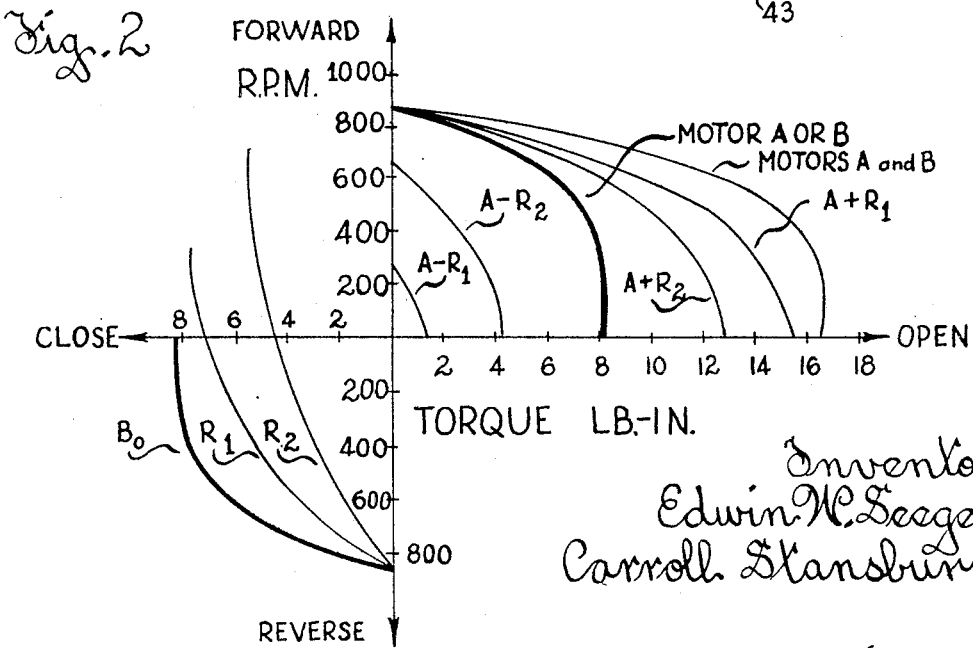

Fig. 2 graphically illustrates a number of speed-torque characteristics of a system embodying the invention and comprising two motors having the same synchronous speeds, and the same inherent speed-torque characteristics.

Figure 3:
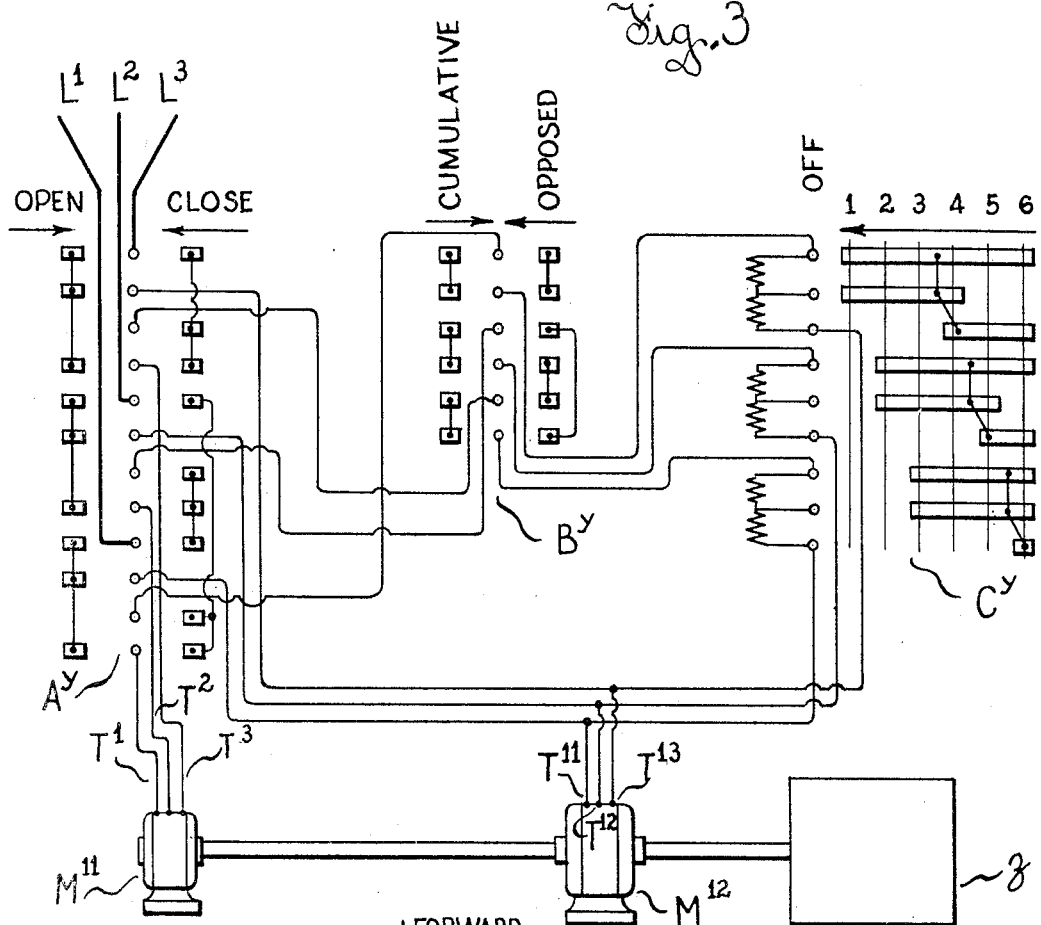
Figure 4:
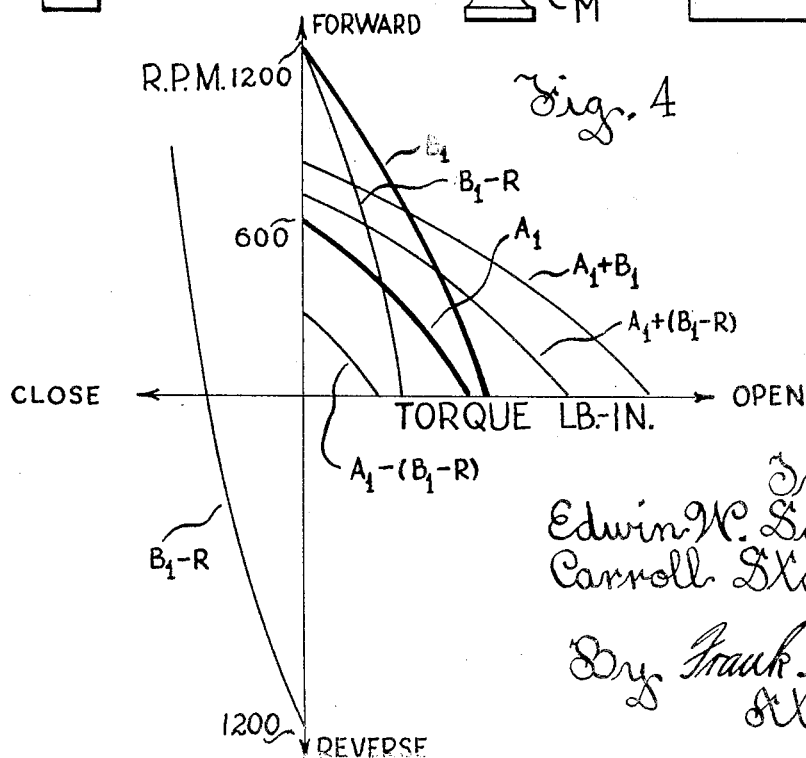

Fig. 3 shows a control system which is a modification of the system shown in Fig. 1, and Fig. 4 graphically illustrates the speed-torque characteristics of a system embodying the invention and comprising two motors having different synchronous speeds and different inherent speed-torque characteristics.

Referring to Fig. 1 the same illustrates two induction motors $M^1$ and $M^2$ which are mechanically coupled with each other. The control apparatus for said motors comprises a main controller or switch $A^x$, a selector switch $B^x$ for the motor $M^2$, and a controller or switch $C^x$ for controlling the resistor inserted into the supply circuit for the motor $M^2$. The controllers $A^x$, $B^x$ and $C^x$ are shown as of the drum type, but they may be of any other suitable type. The controller $A^x$ is provided with stationary drum contact fingers 1 to 6, inclusive; fingers 5, 3 and 1 being respectively connected to the lines $L^1$, $L^2$ and $L^3$ of an alternating current supply system. The fingers 6, 4 and 2 are respectively connected to the terminals $T^1$, $T^2$ and $T^3$ of motor $M^1$, and are also respectively connected to the fingers 25, 23 and 21 of the controller $B^x$, which is provided with stationary contact fingers 21 to 26, inclusive. By rotating the controller $A^x$ from the neutral position in one direction or the other the lines $L^1$, $L^2$ and $L^3$ are selectively connectable in reverse relationships to the terminals $T^1$, $T^2$ and $T^3$ and simultaneously in reverse relationships to the fingers 25, 23 and 21, respectively. The fingers 26, 24, and 22 of controller $B^x$ are connected to fingers 37, 34 and 31 of the controller $C^x$, which is provided with stationary contact fingers 31 to 39, inclusive. By rotating the controller $B^x$ in one direction or the other, the fingers 31, 34 and 37 are reversibly connected to the fingers 21, 23 and 25, respectively. Connected between the terminals 31 and 32 is a resistor $r^1$ and connected between terminals 32 and 33 is a resistor $r^2$. Similar resistors $r^3$ and $r^4$ and resistors $r^5$ and $r^6$ are connected between the fingers 34, 35 and 35, 36, and between the fingers 37, 38 and 38, 39, respectively. The fingers 39, 36 and 33 are also connected to the terminals $T^{11}$, $T^{12}$ and $T^{13}$ of the motor $M^2$. The controller $C^x$ is provided with contacts by means of which the resistors $r^1$ to $r^6$, inclusive, are successively short circuited, in the sequence $r^1$, $r^3$, $r^5$, $r^2$, $r^4$ and $r^6$, whereby the resistance in the circuit of the motor $M^2$ and thereby the torque or the motor is varied.

The rotors of the two motors $M^1$ and $M^2$ are mechanically coupled as indicated by the common shaft X shown in dotted lines, and shaft X may be rigidly connected to a shaft Y which drives suitable bevel gears which operate the jaws 41, 42, 43 and 44 provided upon the face plate of a lathe chuck 40, in any well known or desired manner.

Referring now to Fig. 2 the same illustrates a speed-torque curve, marked "Motor A or B" which represents the individual speed-torque curve of either one of the two motors, if full line voltage is applied thereto. There is also shown the speed-torque curve $B_0$, which is the same as the first mentioned speed-torque curve, except for reverse rotation of the motor. If a given resistor is inserted into the motor circuit the curve $R_1$ is obtained, whereas if a resistor of greater value is inserted, the speed-torque curve $R_2$ is obtained. The speed-torque curve marked "Motors A and B" represents the cumulative or combined values of the speed-torque curves of both motors, if full line voltage is applied thereto.

If now the two motors are energized for rotation in the same direction with the resistor providing the aforementioned curve $R_1$ inserted into the circuit of the second motor, the speed-torque curve obtained is indicated by $A+R_1$, whereas if the resistor providing the aforementioned curve $R_2$ is inserted into the circuit of the second motor the curve $A+R_2$ is obtained. If, however, the second motor is energized in series with the resistor $R_1$ and connected in circuit so as to tend to rotate in the opposite direction, the speed-torque curve $A-R_1$ is obtained, whereas if the resistor $R_2$ is inserted into the circuit of the motor $M^2$ the curve $A-R_2$ is obtained. It will thus be seen, that by changing the direction of rotation of one of the motors relatively to the other, and by further varying the value of the resistor in circuit with the second motor, a great variety of speed-torque curves can be obtained.

Thus the jaws 41 to 44, inclusive, (Fig. 1) may be operated to close or open at any desired speed, and the stalled torque with which the jaws clamp the work-piece can be controlled over a very wide range. This makes it possible to close the jaws at a relatively low speed and keep the stalled torque within limits, so as not to injure or mar the work-piece, whereas the jaws can be opened at a relatively high speed to permit a quick release of the work-piece.

In normal operation when using the system of Fig. 1 the controller $C^x$ is set so as to insert the desired value of resistance into the circuit of the motor $M^2$, thereafter the controller $B^x$ is set so that the two motors will have either cumulative or opposing torques, and thereupon the controller $A^x$ is operated to energize both motors to close or open the jaws, as may be required. It is of course possible to interlock the controller $B^x$ with the controller $A^x$ in such a manner that both will be operated simultaneously, so that in closing the torques of the two motors $M^1$ and $M^2$ are opposed to each other, whereas in opening they are cumulative. Other modifications are obvious or will readily suggest themselves to those skilled in this art.

Referring now to the system shown in Fig. 3, the two motors $M^{11}$ and $M^{12}$ are again mechanically coupled with each other and with the machine (such as a lathe chuck shown diagrammatically at Z) to be driven thereby. In this case the system comprises a set of controllers $A^y$, $B^y$ and $C^y$, the controllers $B^y$ and $C^y$ being substantially like the respective controllers $B^x$ and $C^x$ of the system shown in Fig. 1. The controller $A^y$, however, is arranged so as to connect the motor $M^{11}$ reversibly to the lines $L^1$, $L^2$ and $L^3$ upon operation of the controller in opposite directions, and to connect the motor $M^{12}$ directly to the line cumulatively with the motor $M^{11}$ for the opening of the jaws, while if the controller $A^y$ is moved to the closing position the motor $M^{12}$ is connected to the lines in series with the controllers $B^y$ and $C^y$, the controller $B^y$ being capable of reversing the direction of rotation of the motor $M^{12}$ relatively to the motor $M^{11}$ in the manner aforedescribed, while the controller $C^y$, may be set for the desired torque of the motor $M^{12}$ by varying the resistance in circuit therewith.

Fig. 4 is a diagram of a system applicable to the controller elements of either of Figs. 1 or 3, wherein the two motors have different speed-torque characteristics and different synchronous speeds. The curve $A_1+B_1$ shows the effect of connecting the two motors cumulatively, both without resistance in circuit, for opening movement of the chuck jaws; whereas the curves $A_1+(B_1-R)$ and $A_1-(B_1-R)$ show the effect of adding and subtracting respectively the torque of motor $M^{12}$ to or from that of motor $M^{11}$, the torque of motor $M^{12}$ being reduced by the insertion of a given value of resistance between the supply lines and the motor terminals. These curves are merely illustrative of a great variety of such curves obtainable by combining motors having various synchronous speeds and speed-torque characteristics.

We claim:

1. A system for controlling the speed of operation of polyphase induction motors in opposite directions, comprising, in combination, two reversible polyphase induction motors, each having a rotor, said rotors being mechanically coupled to each other, each motor also having an energizing winding adapted to induce a field rotatable in opposite directions selectively, means for connecting said windings in parallel with each other including means for separately determining the direction of rotation of said fields relatively to each other for different directions of joint operation of said motors, selective means affording joint energization of said windings for operation of said motors in opposite directions of rotation, and means for selectively varying the speed-torque characteristic of at least one of said motors, to thereby vary the combined speed-torque characteristics of said motors upon joint operation thereof in opposite directions, respectively.

2. A system for controlling the speed of operation of polyphase induction motors in opposite directions, comprising, in combination, a source of energy supply, two reversible polyphase induction motors, each having a rotor, said rotors being mechanically coupled to each other, each motor also having an energizing winding adapted to induce a field rotatable in opposite directions selectively, each of said motors having a given speed-torque characteristic upon connection thereof to said source for rotation of said field in either direction, means for connecting said windings in parallel with each other including means for separately determining the direction of rotation of said fields relatively to each other for different directions of joint operation of said motors, selective means affording joint connection of said windings to said source for operation of said motors in opposite directions of rotation, and means operable at will for varying the speed-torque characteristic of one of said motors through a relatively wide range upon connection of its energizing winding to said source for alternate directions of rotation of said field, to thereby vary the combined speed-torque characteristics of said motors for joint operation thereof in opposite directions of rotation, respectively.

3. A system of control for polyphase induction motors comprising, in combination, a source of energy supply, a first reversible polyphase induction motor having a given speed-torque characteristic upon connection thereof to said source in either relation, a second reversible polyphase induction motor having its rotor mechanically coupled to the rotor of said first motor, said second motor normally having a given speed-torque characteristic upon connection thereof to said source in either relation, and means operable at will for varying the speed-torque characteristic of said second motor throughout a relatively wide range upon connection thereof in either relation to said source, to thereby vary the combined speed-torque characteristics of said motors upon joint operation thereof in opposite directions respectively, said last mentioned means including a variable resistance to be included in or excluded from the primary circuit of said second motor.

4. A system for controlling induction motors comprising, in combination, a pair of induction motors each having a rotor and a primary winding, said rotors being coupled mechanically for joint rotation at fixed speed ratios, and selective means for jointly connecting the primary windings of said motors to a source of energy for alternate rotation in opposite directions, including means for reversing the connections of the two motors relatively to each other and further including means to effect different combined speed-torque characteristics of the motors for opposite directions of rotation.

5. A system for controlling induction motors comprising, in combination, a pair of induction motors having different inherent speed-torque characteristics, each motor having a primary winding and a rotor, said rotors being coupled mechanically for joint rotation at fixed speed ratios, and selective means for jointly connecting the primary windings of said motors to a source of energy for alternate rotation in opposite directions, including means for reversing the connections of the windings of the two motors relatively to each other and further including means to effect different combined speed-torque characteristics of the motors for opposite directions of rotation.

6. A system for controlling induction motors comprising, in combination, a pair of induction motors having different inherent speed-torque characteristics, each motor having a primary winding and a rotor, mechanical coupling means for the rotors of said motors providing for rotation thereof jointly at the same speed, means to reversibly connect the primary windings of said motors to a source of energy jointly in a manner to selectively provide for action of said windings either reversely or cumulatively with respect to each other, said means including means to effect different combined speed-torque characteristics of the motors during rotation thereof jointly in opposite directions respectively.

7. A system for controlling induction motors comprising, in combination, a pair of induction motors having different inherent speed-torque characteristics, means for mechanically coupling the rotors of said motors to provide for joint rotation thereof at fixed speed ratios, and means for jointly connecting the primary windings of said motors to a source of energy for alternate rotation in opposite directions selectively, including means to effect different speed-torque characteristics for opposite directions of rotation of one of the motors.

8. A system for controlling induction motors comprising, in combination, a pair of polyphase induction motors having different synchronous speeds, each motor having a primary winding and a rotor, mechanical coupling means for the rotors providing for joint rotation at fixed speed ratios thereof, means to reversibly connect the primary windings of said motors to a source of energy jointly, and means to vary the inherent speed-torque characteristic of at least one of said motors to effect different combined speed-torque characteristics of the motors in opposite directions of rotation.

9. A system for controlling induction motors comprising, in combination, a pair of polyphase induction motors having different synchronous speeds, each motor having a primary winding and a rotor, mechanical coupling means for the rotors providing for joint rotation at fixed speed ratios thereof, means to jointly connect the primary windings of said motors to a source of energy reversibly and/or reversely relatively to each other, and associated means to vary the inherent speed-torque characteristic of one of said motors to effect different combined speed-torque characteristics of the motors upon joint rotation of the rotors thereof in opposite directions respectively.

10. A system for controlling induction motors comprising, in combination, a pair of polyphase induction motors each having a primary winding and a rotor, mechanical coupling means for the rotors of said motors providing for joint rotation at fixed speed ratios thereof, means to reversibly connect the primary windings of said motors to a source of energy jointly, and means to vary the speed-torque characteristic of one motor to afford different resultant speed-torque characteristics of said motors for opposite directions of rotation.

11. A system for controlling induction motors comprising, in combination, a pair of polyphase induction motors each having a primary winding and a rotor, mechanical coupling means for the rotors of said motors providing for joint rotation at fixed speed ratios thereof, and means to reversibly connect the primary windings of said motors to a source of energy jointly, said last mentioned means including means to reverse the connections of one motor relatively to the connections of the other of said motors for opposite directions of rotation.

12. A system for controlling induction motors comprising, in combination, a pair of polyphase induction motors each having a primary winding and a rotor, mechanical coupling means for the rotors of said motors providing for joint rotation at fixed speed ratios thereof, means to reversibly connect the primary windings of both motors to a source of energy jointly, means to adjust the speed-torque characteristic of one of said motors for at least one direction of rotation thereof, and means to reverse the connections of one motor relatively to the connections of the other motor.

13. A system for controlling induction motors comprising, in combination, a pair of polyphase induction motors, a common shaft for rigidly connecting the rotors of said motors with each other, an individual adjustable impedance connectable in series with the primary winding of at least one of said motors, a commutating switch for adjusting said impedance, and a selector switch for connecting the primary windings of said motors jointly to a source of energy, inclusive of alternative values of said impedance.

14. A system for controlling induction motors comprising, in combination, a pair of polyphase induction motors, a common shaft rigidly connecting the rotors of said motors with each other, an adjustable impedance connectable in series with the primary winding of one of said motors, a commutating switch for adjusting said impedance, and a selector switch for simultaneously connecting the primary windings of both motors directly to a source of energy and for alternatively connecting the primary winding of one motor directly and simultaneously connecting the primary winding of the other motor in series with said impedance to said source.

15. A system for controlling polyphase induction motors comprising, in combination, a pair of polyphase induction motors, means for mechanically coupling the rotors of said motors, an adjustable impedance connectable in series with the primary winding of one of said motors, a commutating device for adjusting said impedance, and associated means operable at will to simultaneously connect the primary windings of both motors directly to a source of energy for rotation in one direction, said means being also operable at will to alternatively connect the primary winding of one motor directly to said source and to simultaneously connect the primary winding of the other motor to said source in series with a predetermined portion of said impedance for rotation in the opposite direction.

16. A reversible motor drive comprising, in combination, a pair of polyphase induction motors, means for mechanically coupling the rotors of said motors, a resistance adapted to be included in or excluded from the circuit of the primary winding of one of said motors, means operable at will to adjust the value of said resistance to be included in said circuit, and associated means operable at will to simultaneously connect the primary windings of both motors to a suitable source of energy for operation thereof cumulatively to effect rotation of said drive in one direction, said means being also operable at will to alternatively connect the primary windings of said motors to said source in reverse relationship to each other to effect rotation of said drive in the opposite direction, said resistance adjusting means being operable at will to vary the speed-torque characteristic of its associated motor under either of said conditions, for the purpose set forth.

EDWIN W. SEEGER.
CARROLL STANSBURY.